Patented June 30, 1925.

1,544,210

UNITED STATES PATENT OFFICE.

ERNEST C. BIERCE, OF LOS ANGELES, CALIFORNIA, ASSIGNOR TO REFINERIES CLAY CO., OF LOS ANGELES, CALIFORNIA, A CORPORATION OF CALIFORNIA.

PROCESS OF TREATING COLLOIDAL CLAY.

No Drawing.      Application filed July 31, 1924. Serial No. 729,344.

*To all whom it may concern:*

Be it known that I, ERNEST C. BIERCE, a citizen of the United States, residing at Los Angeles, in the county of Los Angeles and State of California, have invented new and useful Improvements in Processes of Treating Colloidal Clay, of which the following is a specification.

My invention relates to a treatment of colloidal clay for the use of filtration and decolorization of oils, vegetable and mineral and especially hydrocarbon products.

In processes hitherto in use for treating colloidal clays to make them suitable for the treatment of oils and hydrocarbon products, as just mentioned, the usual method is to subject the clay to a preliminary grinding, to add water thereto and then to add a relatively large quantity of sulphuric acid. The final product, after grinding and screening resulted in fines, that is, particles passing through a 200 mesh screen. These fines are used in so-called contact processes in the treatment of petroleum products, which consists in mixing the petroleum product with the fine clay, heating the same under agitation and then filter pressing the liquid.

The majority of refiners use the percolation method which consists in passing the hydrocarbon products through a layer of coarse particles of fuller's earth.

Since the percolation method is in use by a majority of the refiners at the present time, the object of this invention is to produce a coarse clay suitable for the percolation method, which coarse clay will have a higher efficiency than ordinary fuller's earth.

Herebefore when attempts were made to produce such a treated clay in coarse particles, it has been found that these particles broke down into powder and rendered them unsuitable for percolation.

It is an object of this invention to provide an improved method of treating colloidal clays which will dispense with the preliminary grinding and the addition of water, simplify the method, use a smaller amount of sulphuric acid and increase the yield of coarse clay particles. Another object is to produce coarse clay particles which are porous and yet hard and will not break down into finer particles during the percolation process or during subsequent handling and calcining incident to the revivification process.

Other objects will appear as the description proceeds.

My invention consists of the steps of the process herein described and claimed:

The colloidal clay used for the filtration and decolorization of oils and petroleum products is found, among other places, in San Diego County, California, six miles southeast of San Diego, at Chula Vista, and three miles east of San Diego at Otay. It is called Montmorillonite, is of a waxy appearance, its color is pink, brown, white and of intermediate shades.

Similar clay is found in Santa Barbara and Ventura Counties, California, called pyrophyllite, is of a waxy appearance, and its color ranges from cream to a slate color.

The clay is taken from the quarry in lumps from six to eight inches in diameter, and contains approximately 25% of free water. It is dumped into a dryer, and the water content is reduced from 10 to 12%, then without any preliminary grinding, 80 pounds of sulphuric acid of 66° Bé. per ton is dumped onto the clay and the dryer is operated for about 10 minutes to allow the sulphuric acid to complete its reaction, forming aluminium sulphate.

The material is now passed through a grinder of any suitable or preferred construction, which reduces the lumps to a size that they will pass through a 4 mesh screen or less. Now 20 pounds of sulphuric acid of 66° Bé. per ton is added to the mixture, the object of the second addition of sulphuric acid is to attack those particles of clay in the lumps that were not accessible to the acid of the first addition, when the lumps were of larger size.

The water content of the mixture is now approximately 4 to 5% free water. This water content, however, may be reduced or varied as desired.

The mixture is now passed through an 80 mesh screen to take out the finest particles of clay. The over size clay is put through a 20 mesh screen, and the over size from that is returned to the grinder.

The particles passing through the 80 to 20 mesh screens are used for the percolation method, and these may be graded into finer or coarser particles, as desired, and used for the filtration of gasoline or the various hydrocarbon products.

It should be noted that in my process, the preliminary grinding is dispensed with, no water is added to the clay, a relatively small quantity of sulphuric acid is used, and a larger yield of coarse particles, approximately 65% of the coarser particles is obtained.

The fine particles that result from my process and which are used for the contact process, are equal in quality to any fine particles used in the prior art, but the coarser particles used for the percolation method are superior in porosity and in hardness. This physical condition of the coarser particles appears to be due to the treatment of the clay direct without the preliminary grinding and treatment with water and with acid.

In place of sulphuric acid, hydrochloric acid or any other mineral acid may be used, or a mixture of any two or all three of them, although sulphuric acid is preferred because of its low cost.

Various changes in the steps of the process may be made by those skilled in the art without departing from the spirit of my invention, as claimed.

I claim:

1. The process of treating colloidal clay to produce a filtering and decolorizing material comprising drying the lumps of clay as they come from the quarry without any preliminary grinding or addition of water until its free water content is reduced to approximately 12%, adding mineral acid in the proportion of approximately 4% to the clay, further drying to reduce the free water content to about 5%, comminuting the clay to pass through a coarse mesh screen, adding 1% of mineral acid, screening the clay to separate the finer particles suitable for the contact process of filtration from the coarser particles suitable for the percolation method of filtration.

2. The process of treating colloidal clay to produce a filtering and decolorizing material comprising drying the lumps of clay as they come from the quarry until its free water content is reduced to approximately 12%, adding less than 5% of mineral acid to the clay, comminuting the clay to pass through a coarse mesh screen, adding approximately 1% of mineral acid to the clay and screening the clay to separate the finer particles suitable for the contact process of filtration from the coarser particles suitable for the percolation process of filtration.

3. The process of treating colloidal clay to produce a filtering and decolorizing material comprising drying the lumps of clay as they come from the quarry to reduce its free water content, adding less than 5% of mineral acid to the clay, comminuting the clay to pass through a coarse mesh screen, adding approximately 1% of mineral acid and screening the clay to separate the finer particles suitable for the contact process of filtration from the coarser particles suitable for the percolation process of filtration.

4. The process of treating colloidal clay to produce a filtering and decolorizing material comprising drying the lumps of clay as they come from the quarry to reduce its free water content and adding approximately 5% of mineral acid to the clay, comminuting the clay and separating the finer particles suitable for the contact process of filtration from the coarser particles suitable for the percolation process of filtration.

5. The process of treating colloidal clay to produce a filtering and decolorizing material comprising drying the clay to reduce its free water content, adding a relatively small quantity of mineral acid thereto, comminuting the clay and separating the finer particles suitable for the contact process of filtration from the coarser particles suitable for the percolation process of filtration.

6. The process of treating colloidal clay to produce a filtering and decolorizing material comprising drying the lumps of clay as they come from the quarry without any preliminary grinding or addition of water until its free water content is reduced, adding a relatively small quantity of mineral acid thereto, comminuting the clay and separating the finer particles and screening them and separating them into various sizes.

In testimony whereof I have signed my name to this specification.

ERNEST C. BIERCE.